US012791225B2

(12) United States Patent
McPheeters

(10) Patent No.: US 12,791,225 B2
(45) Date of Patent: Nov. 10, 2026

(54) TRUSS FOUNDATIONS FOR SOLAR TRACKER CENTER STRUCTURES AND DRIVE MOTORS

(71) Applicant: Nextpower LLC, Fremont, CA (US)

(72) Inventor: Greg McPheeters, Santa Cruz, CA (US)

(73) Assignee: NEXTPOWER LLC, Fremont, CA (US)

( * ) Notice: Subject to any disclaimer, the term of this patent is extended or adjusted under 35 U.S.C. 154(b) by 622 days.

(21) Appl. No.: 17/511,546

(22) Filed: Oct. 26, 2021

(65) Prior Publication Data

US 2022/0128268 A1 Apr. 28, 2022

Related U.S. Application Data

(60) Provisional application No. 63/105,756, filed on Oct. 26, 2020.

(51) Int. Cl.

| | |
|---|---|
| ***F24S 25/13*** | (2018.01) |
| ***F24S 25/617*** | (2018.01) |
| ***F24S 50/20*** | (2018.01) |
| ***H02S 20/32*** | (2014.01) |
| ***H02S 30/10*** | (2014.01) |
| *F24S 25/12* | (2018.01) |

(52) U.S. Cl.
CPC ............... *F24S 25/13* (2018.05); *F24S 50/20* (2018.05); *H02S 20/32* (2014.12); *H02S 30/10* (2014.12); *F24S 25/12* (2018.05)

(58) Field of Classification Search
CPC .......... F24S 25/12; F24S 25/13; F24S 25/617; F24S 50/20; H02S 20/32; H02S 30/10; Y02E 10/47; Y02E 10/50
See application file for complete search history.

(56) References Cited

U.S. PATENT DOCUMENTS

| | | | | |
|---|---|---|---|---|
| 1,176,605 | A * | 3/1916 | Schad | E02D 7/22 81/32 |
| 2,237,383 | A * | 4/1941 | Agostineto | E02D 7/22 175/21 |
| 3,961,671 | A * | 6/1976 | Adams | E02D 5/801 52/741.11 |
| 4,614,462 | A * | 9/1986 | Itou | E02D 7/22 405/232 |
| 5,127,342 | A * | 7/1992 | Taylor | A47B 57/265 211/187 |
| 5,170,850 | A * | 12/1992 | Sassak, II | E21B 3/03 405/232 |
| 2008/0260470 | A1* | 10/2008 | Bullivant | E02D 5/48 405/232 |

(Continued)

*Primary Examiner* — Michael G Hoang
*Assistant Examiner* — Logan P Jones
(74) *Attorney, Agent, or Firm* — Fredrikson & Byron, P.A.

(57) ABSTRACT

A center structure support for single-axis trackers to support tracker driver motors and tracker center structures that transfer torque across rows to enable a single tracker motor to rotate the torque tubes of several adjacent rows. A pair of driven screw anchors are joined above ground with a center structure support and a pair of clamp assemblies that capture the driving coupler at the upper end of each screw anchor. The clamp assemblies are captured in distal ends of the center structure support via bolts that enable adjustment center structure relative to the driven legs.

18 Claims, 8 Drawing Sheets

(56) References Cited

U.S. PATENT DOCUMENTS

| | | | | |
|---|---|---|---|---|
| 2008/0308091 | A1* | 12/2008 | Corio | F24S 30/425<br>126/606 |
| 2013/0341296 | A1* | 12/2013 | Sanford | F16B 12/40<br>211/187 |
| 2016/0013751 | A1* | 1/2016 | Michotte De Welle | H02S 20/32<br>136/246 |
| 2016/0348332 | A1* | 12/2016 | Talbert | E02D 7/22 |
| 2017/0234580 | A1* | 8/2017 | Worden | F24S 30/42<br>126/606 |
| 2018/0051915 | A1* | 2/2018 | Rainer | F24S 25/10 |
| 2018/0226915 | A1* | 8/2018 | Henderson | F16H 19/001 |
| 2018/0313051 | A1* | 11/2018 | West | E02D 13/04 |

* cited by examiner

TRUSS FOUNDATIONS FOR SOLAR TRACKER CENTER STRUCTURES AND DRIVE MOTORS

CROSS-REFERENCE TO RELATED APPLICATIONS

This claims priority to U.S. provisional patent application No. 63/105,756 filed on Oct. 26, 2020, titled "TRUSS FOUNDATIONS FOR SOLAR TRACKER CENTER STRUCTURES", the disclosure of which is hereby incorporated by reference in its entirety.

BACKGROUND

The applicant of this disclosure has developed a truss-based foundation system for supporting single-axis trackers, fixed-tilt solar arrays and other structures. Known commercially as EARTH TRUSS, this system relies on a pair of adjacent legs that form a truss with the ground. In a typical configuration, each leg consists of a below ground portion called a screw anchor driven partially into the ground, and an upper leg section that is sleeved over a coupler at the upper end of each anchor. The free ends of each upper leg section are joined together with a so-called truss cap or adapter that unifies these components into a complete foundation structure. In the current form of the EARTH TRUSS, crimps are used to secure overlapping portions of the upper leg sections to their respective screw anchors and to connectors on the truss cap.

Until the EARTH TRUSS system emerged on the market, tracker makers designed their systems to be supported by generic H-pile foundations. H-piles are standard wide flange galvanized steel beams such as W6×9 s, W6×12 s, or combinations of these driven at a plum orientation. These beams are driven into the ground with an impacting or vibratory pile driver in repeated North-South oriented rows across the intended array site. Some tracker makers specify the same foundation for each supported component (e.g., bearing, motors, etc.) whereas others may require lower, taller, and/or heavier foundations at certain points in the array depending on the loads that must be resisted at those points. For example, motor piles and those around the permitter of the array often experience larger top-of-pile loads than internal bearing piles that experience relatively lower forces. With H-piles, variances for particular foundations are relatively easy to accomplish by simply adjusting the size of the beam, the driving depth, and/or the reveal height (i.e., the length remaining above-ground after driving). Such variations are more difficult to accommodate with same-sized truss foundations. However, in order for EARTH TRUSS to be competitive with H-piles, a solution is needed for these non-standard foundation case that relies on substantially the same components and the same installation machine and work flows.

Taking for example, the Horizon NX tracker from Array Technologies, Inc. (ATI) of Albuquerque, NM, in that tracker, one foundation in each row supports a so-called center structure. The center structure is where torque is transferred to the torque tube. For every megawatt or so of tracker, one row has a motorized center structure that applies torque directly to the torque tube above it. The motorized center structure has an output shaft that runs to the non-motorized or passive center structure of the next adjacent row. At that center structure, torque is transferred to a local drive gear but is also output to another drive shaft so that it can be translated to the next adjacent row and so-on and, so-forth. This mechanical linkage continues across all rows supported by the drive motor to enable a single motor to turn multiple rows at once. Universal joint connections between the drive shafts and center structures are used to take up variances in terrain.

Typically, the foundation that supports the center structure must be stronger than other foundations in the row that merely support the torque tube bearings due to the additional forces experienced at the foundation supporting the motor. Also, this foundation typically must be lower to the ground to leave room between the torque tube and the foundation for the center structure. To account for these non-standard cases while minimizing the use of non-standard components used in other foundations, various embodiments of this disclosure provide a foundation for supporting motorized and non-motorized center structures for a connected row tracker system such as the ATI Horizon NX tracker.

DETAILED DESCRIPTION

Figure 1A:
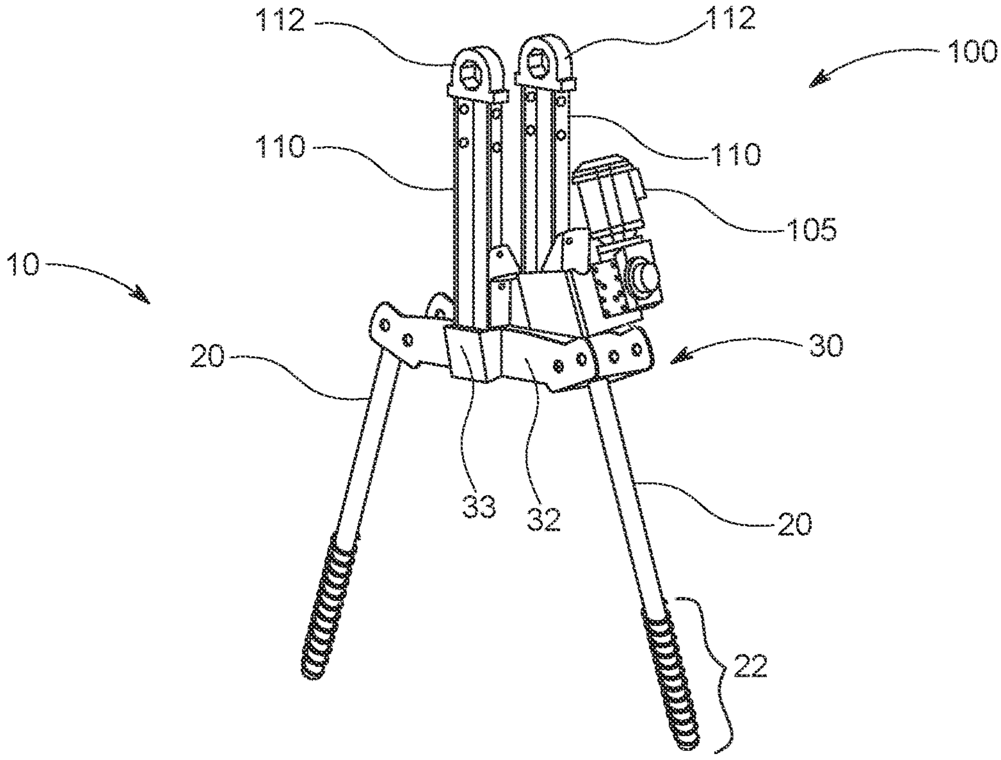
FIG. 1A is a perspective view of a truss foundation supporting a motorized center structure for a linked row single-axis tracker according to various embodiments.
Figure 1B:
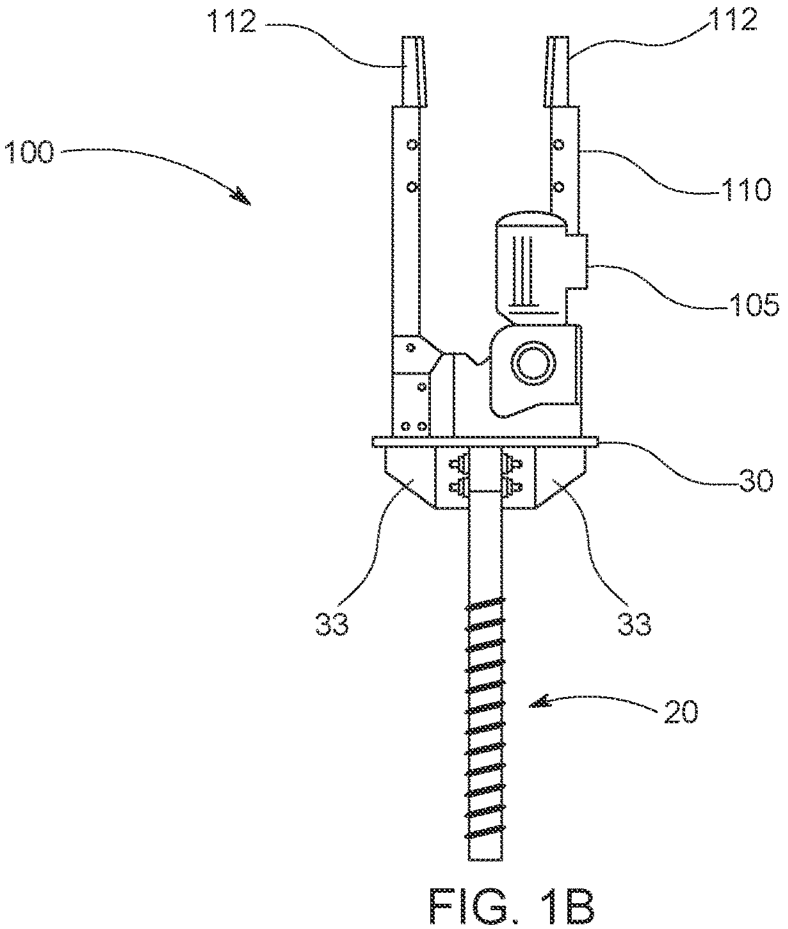
FIG. 1B is a side view of the of the truss foundation supporting a motorized center structure for a linked row single-axis tracker of FIG. 1A.
Figure 1C:
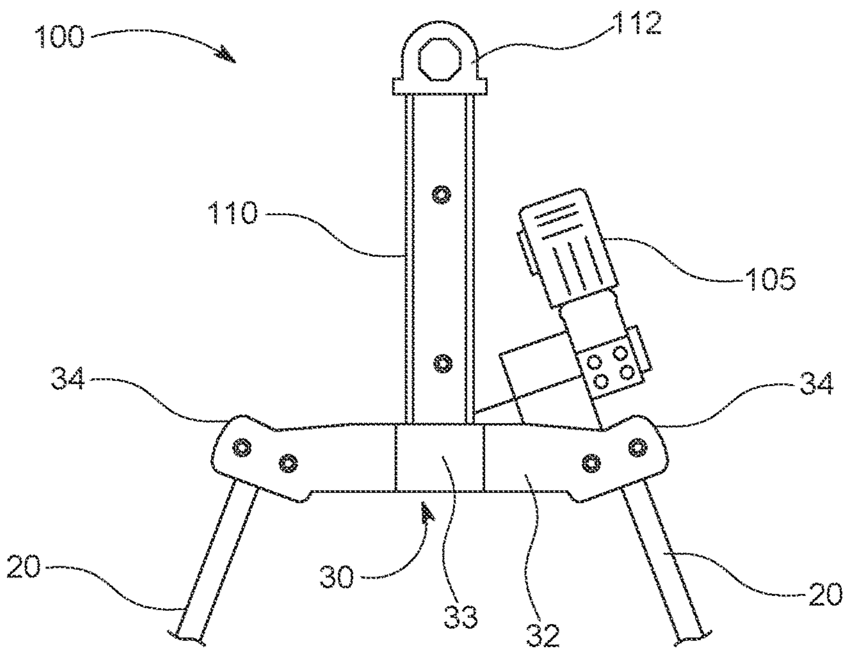
FIG. 1C is a front view of the truss foundation supporting a motorized center structure for a linked row single-axis tracker of FIG. 1A.
Figure 1D:
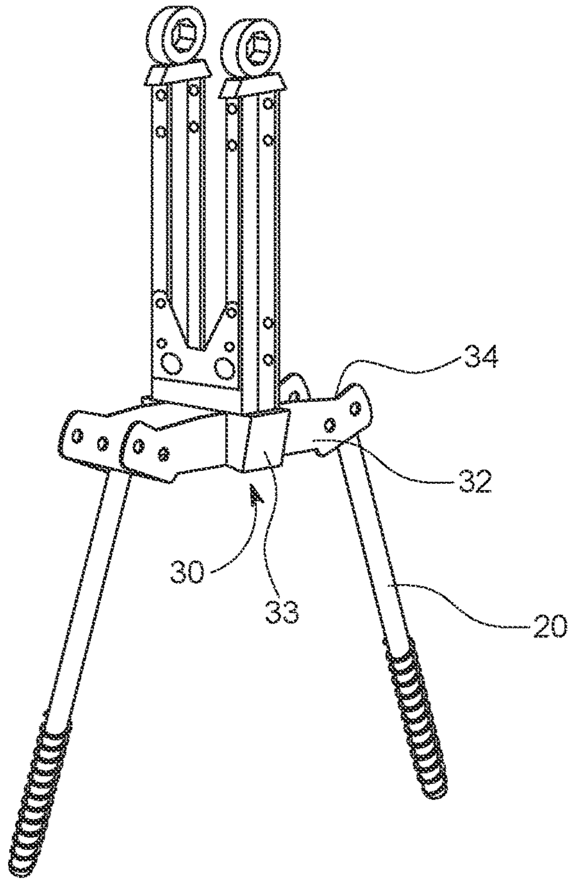
FIG. 1D is a perspective view of a portion a truss foundation supporting a portion of a non-motorized center structure for a linked row single-axis tracker according to various embodiments.
Figure 1E:
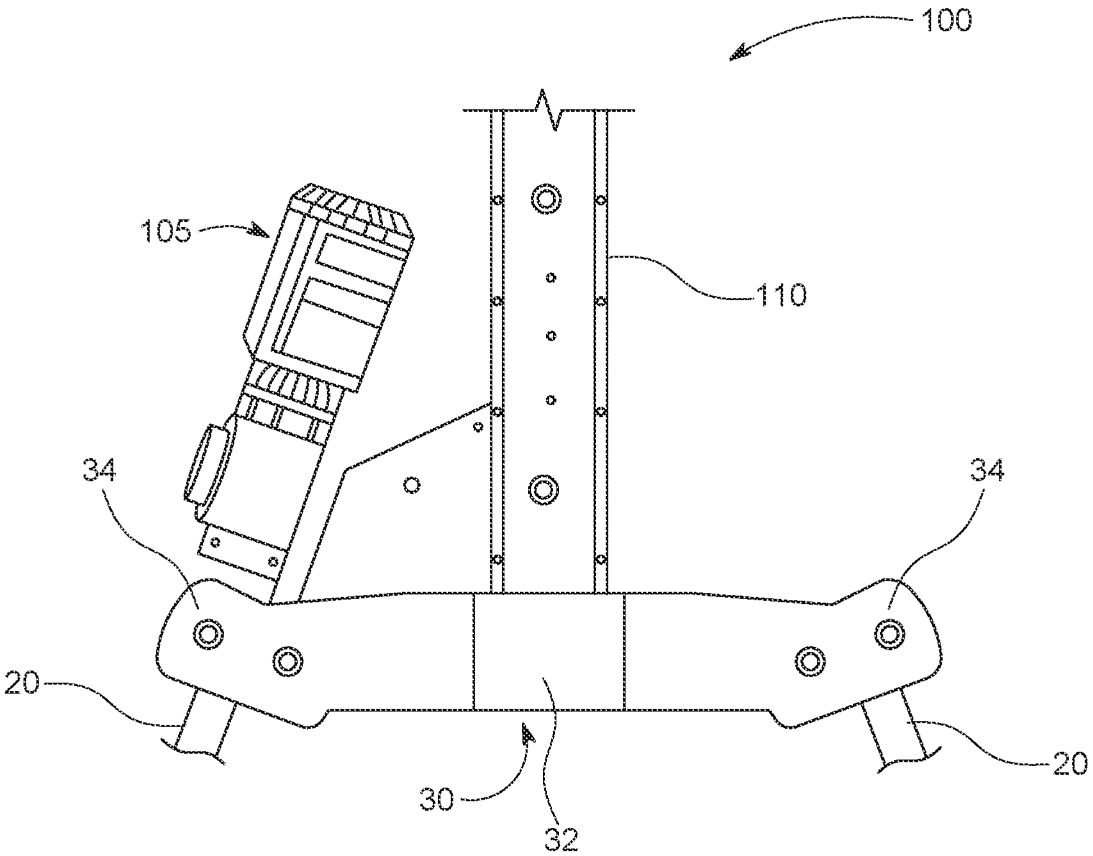
FIG. 1E is a back view of a portion of the truss foundation supporting a motorized center structure for a linked row single-axis tracker of FIG. 1A.
Figure 1F:
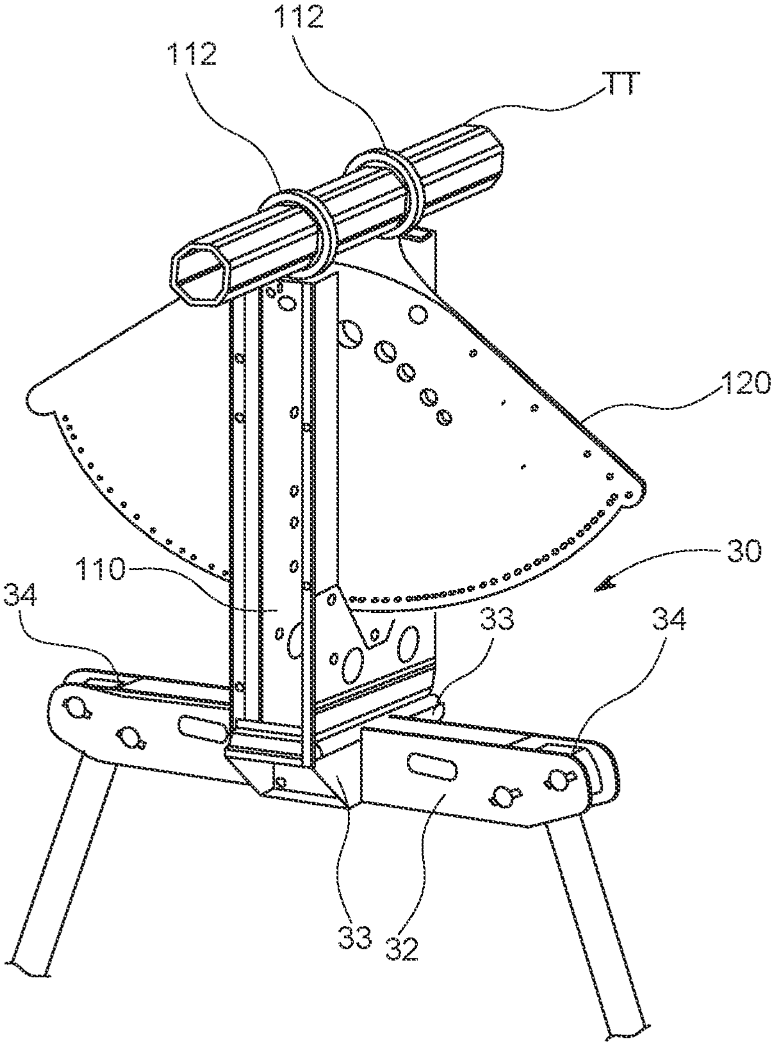
FIG. 1F is a perspective view of a portion of a truss foundation supporting a center structure for a linked row single-axis tracker according to various embodiments.
Figure 2A:
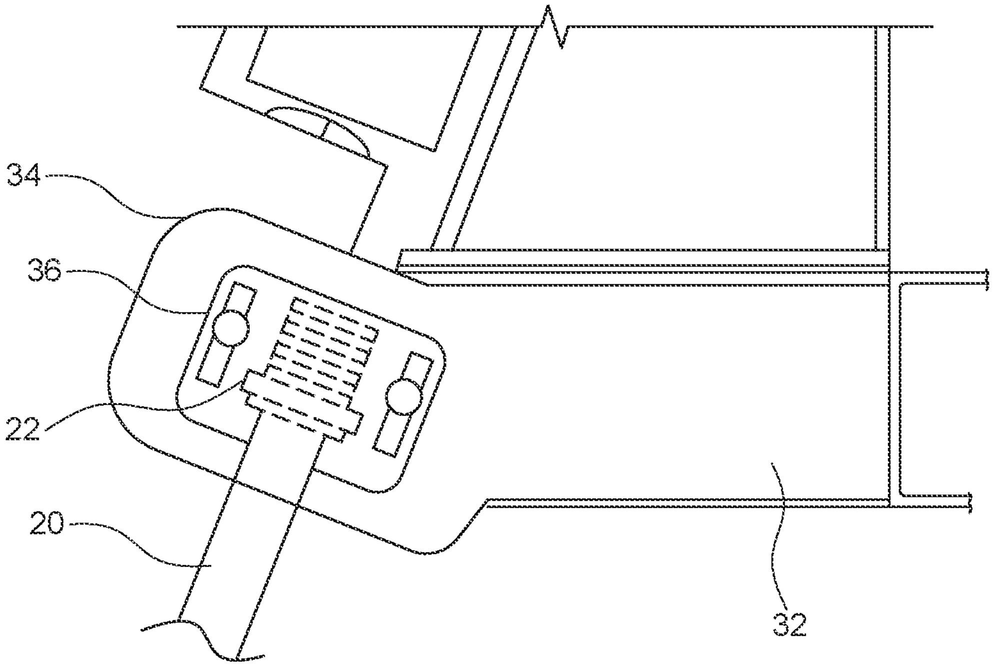
FIG. 2A shows the fitment between an exemplary leg clamp, truss leg and center structure support according to various embodiments.
Figure 2B:
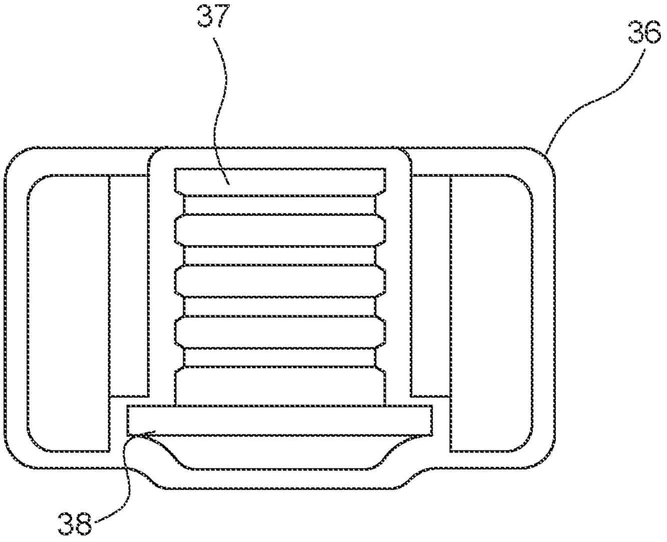
FIG. 2B shows one half of a clamp assembly for a center structure support according to various embodiments.
Figure 2C:
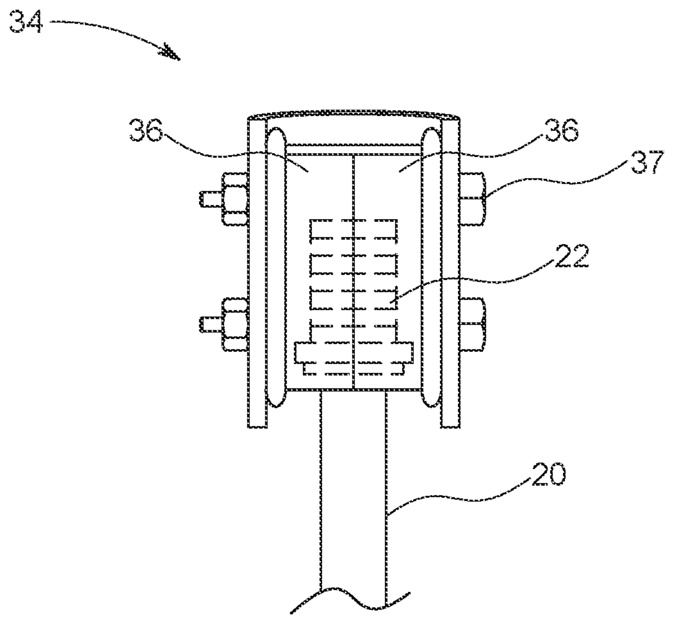
FIG. 2C is an end view showing the fitment between an exemplary leg clamp, truss leg and center structure support according to various embodiments.
Figure 2D:
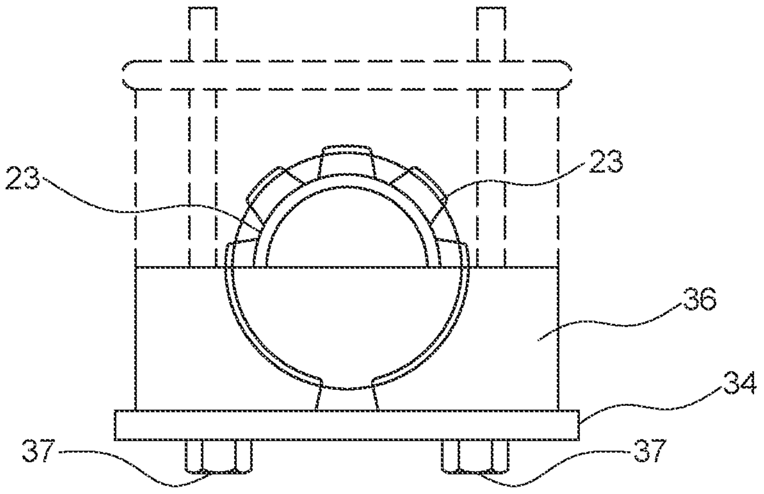
FIG. 2D is an axial view looking into the upper end of a screw anchor showing the fitment between an exemplary leg clamp, truss leg and center structure support according to various embodiments.
Figure 2E:
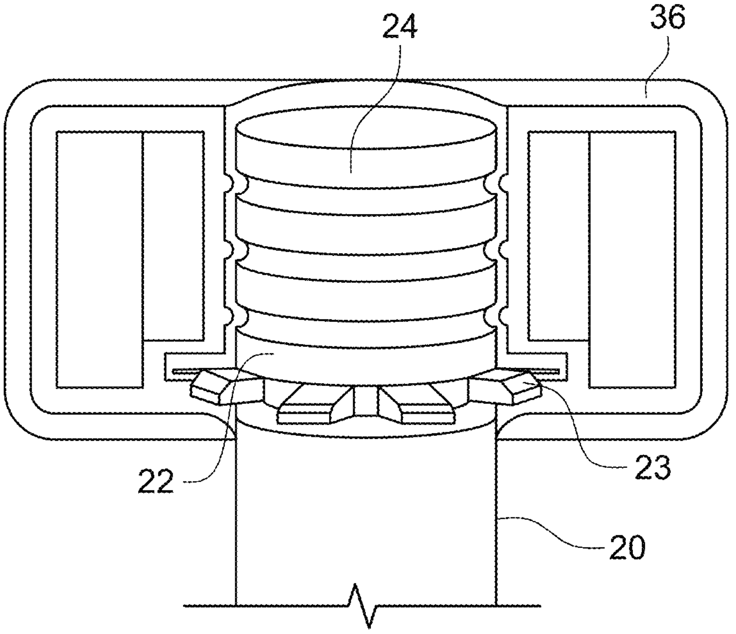
FIG. 2E shows an exemplary driving coupler of a truss leg seated in one half of a leg clamp for a center structure support according to various embodiments.

The following description is intended to convey a thorough understanding of the embodiments described by providing a number of specific embodiments and details involving A-frame-shaped truss foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Turning now to the drawing figures, FIGS. 1A-1F show different views of an ATI center structure assembly supported by a truss foundation according to various embodiments. Motorized center structure assembly 100 shown in FIGS. 1A-1C consists of an electric motor 105 that imparts torque to a gear assembly (not shown), that in turn, drives a torque tube. A pair of parallel bearings 112 extend above motor 105 via arms 110 to receive the rotating torque tube. Gear assembly 120 (FIG. 1F) engages torque tube TT between bearings 112. In the ATI tracker shown in these figures, motor 105 also has an output connected to a drive shaft (not shown) that extends from the motor to a center structure in an adjacent row, such as, for example, the center structure shown in FIG. 1F. Each center structure, whether motorized or non-motorized, has a gear similar to gear 120 shown in FIG. 1F that is engaged by the motor in the row containing the drive motor, or by gear assembly coupled to an output shaft of the motor to slowly turn the torque tube through its full range of rotation. To accommodate large gear 120, arms 110 are used to extend parallel bearings 112 above the drive gear and/or motor assembly to be at the same level as the bearing along the same tracker row. This requires the foundation that supports the center structure, whether motorized or non-motorized, to be lower than other foundations in the same row.

As discussed in the background section, the applicant of this disclosure has developed a novel foundation for supporting single-axis trackers and other devices known commercially as EARTH TRUSS. This foundation consists of a pair of adjacent driven screw anchors, an upper bearing support or so-called truss cap, and a pair of upper leg sections that interconnect the truss cap to the driven screw anchors. In order to utilize the same or similar components and the same or similar installation machine and installation work flows, various embodiments of the invention provide a variant of the EARTH TRUSS foundation adapted to resist forces experienced at the motorized and non-motorized center structures in the ATI tracker system.

One example of this foundation is shown in FIGS. 1A-1F. It includes screw anchors 20, which are elongated steel tubes with external thread form 22 at the lower end and driving coupler 22 at the upper end. Driving coupler 22 consists of a set of driving features 23, in this case, teeth spaced around the outside of the coupler, and projection 24 including a series of parallel recess which, in the case of standard bearing trusses, facilitate crimping of the upper leg sections to the coupler. When supporting the center structure, due to the lowered elevation of the truss, upper leg sections are not required. Therefore, in various embodiments, coupler 22 is used to interconnect screw anchors 20 to center structure support 30 via clamp assemblies 36.

As shown in the figures, center structure support 30 is an elongated structure with main body 32, support portions 33 and open distal ends 34 for receiving clamp assemblies 36. As shown in the figure, the ATI center structure sits on center structure support 30 at the approximate middle, extending transverse to the long axis of support 30, resting on and attached to opposing support portions 33. Bolts, hucks or other fasteners may be used to secure the center structure to support 30. As discussed in greater detail herein, one or more bolts or other fasteners extend through distal ends 34 and clamp assemblies 36 to lock legs 20 and center support structure 30 together.

Turning now to FIGS. 2A-2E, these figures show the fitment between couplers 22 of screw anchors 20, center structure support 30 and clamp assemblies 36. As discussed herein, due to the lower height/elevation of the foundation supporting the center structure relative to other foundation in the same tracker row that support the torque tube bearings, in some cases, it may be desirable and even necessary to support the structure with single component truss legs, that is, screw anchors only without using upper leg sections to span the distance from the driven screw anchor to the apex hardware (i.e., truss cap or adapter). In such cases, the connection interface between driven screw anchors and the center structure support must accept the driving coupler at the head of each screw anchor in order to construct the center structure foundations with the same below-ground truss component as other foundations in the same row. These couplers have a unique geometry that is optimized for two purposes—driving the screw anchor into the ground and joining the screw anchor to an upper leg section. As depicted in the figures, driving features 23 of coupler 20 include a series of teeth projecting radially around the lower end. These teeth are engaged by the chuck of a rotary driver when the anchor is driven into underlying ground. These features 23 also limit the extent of penetration of the coupler into the adjoining upper leg. Coupler 20 also has connecting portion 24 that projects up and away from the driving features. Connecting portion 24 is a cylindrical projection with a slightly rounded profile (i.e., oblate spheroid) that includes several parallel channels circumscribing its surface. In a conventional truss foundation, these channels provide voids so that when the crimper is engaged on the upper leg section covering them, the crimper deforms the upper leg into these channels, securely locking it in place. The slightly rounded profile enables the upper leg section to be adjusted axially relative to the screw anchor when joining the truss cap at the apex of each truss to each screw anchor to compensate for any misalignment occurring between the actual and intended drive axis of the screw anchor.

To accept the geometry of driving coupler 20, various embodiments provide a two-piece clamp assembly 36 that has reciprocal voids shaped and dimensioned to receive the coupler with a clamped rather than crimped connection. This is seen, for example in FIGS. 2B-2E. Clamp assembly 36 shown in the figures consists of a pair of clamp halves that are substantially symmetric and have a relatively wider void 38 formed near the opening at their base of the clamp assembly to receive teeth 23 of the driving coupler. Projecting above that is a longer but narrower banded recess 37. Upper recess 37 is dimensioned to receive connecting portion 24 of coupler 20. When clamped around coupler 20 these negative features prevent clamp assembly 36 from moving with respect to coupler 20 once the claim assembly is locked in place, preserving the orientation and height of the center structure support 30, and by extension the center structure assembly 100, when supporting the tracker. Clamp halves making up clamp assembly 36 also have a pair of large openings on either side that overlap when the halves are clamped around the coupler. These openings are structurally isolated from the voids that receive the coupler and are used to pass bolts such as bolts 37 shown in the figures that extend through the walls of center structure support 30 at distal ends 34 to hold the clamps in place at a different orientations. Looking at FIG. 2A as well as FIG. 3, at each distal end of center structure support 30 has an opening 34 with a pair of opposing flanges that receive one of the two-piece clamp assemblies. A pair of holes or slots on each flange allows bolts or other fasteners to pass completely through center structure support 30 and through each side of clamp assembly 36 while providing some adjustability via the large slots openings formed in the clamp halves as well as smaller slots formed in the flanges of center structure support 30.

Figure 3:
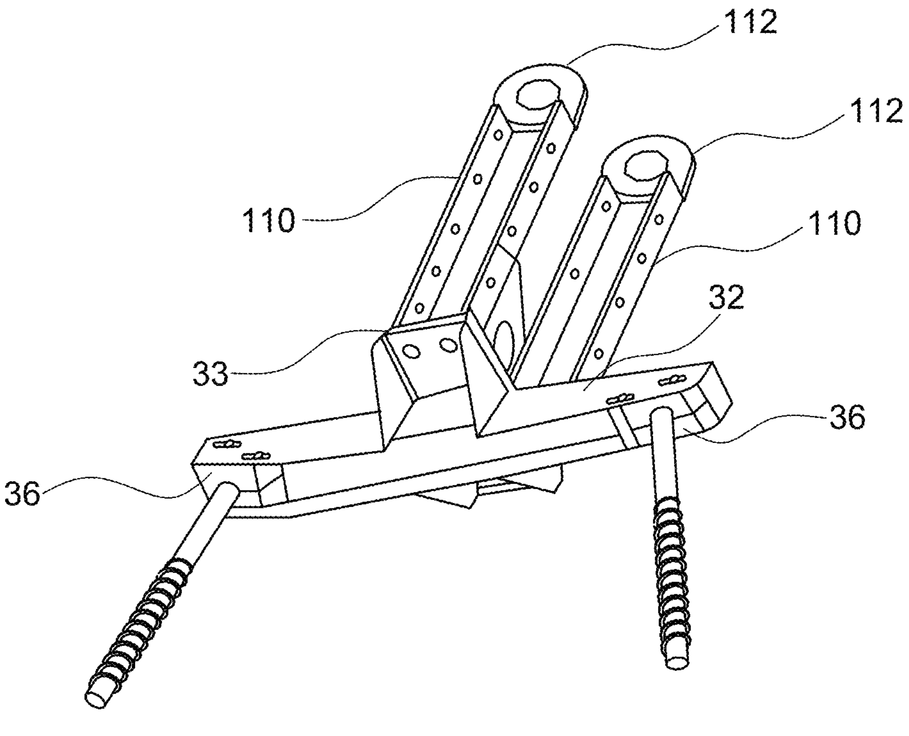
FIG. 3 is an underside view of a truss foundation and center structure support for a single-axis tracker according to various embodiments.

FIG. 3 shows the center structure support with clamp assemblies and a pair of screw anchors supporting the ATI center structure according to various embodiments from below. Each distal end 34 of center structure 30 receives one of clamp assemblies 36 nested between a pair of opposing flanges. Slots or other openings in body 32 of support 30, as well as the large openings in each clamp assembly allow for positional adjustment of the support with respect to the clamp assembly.

Figure 4:
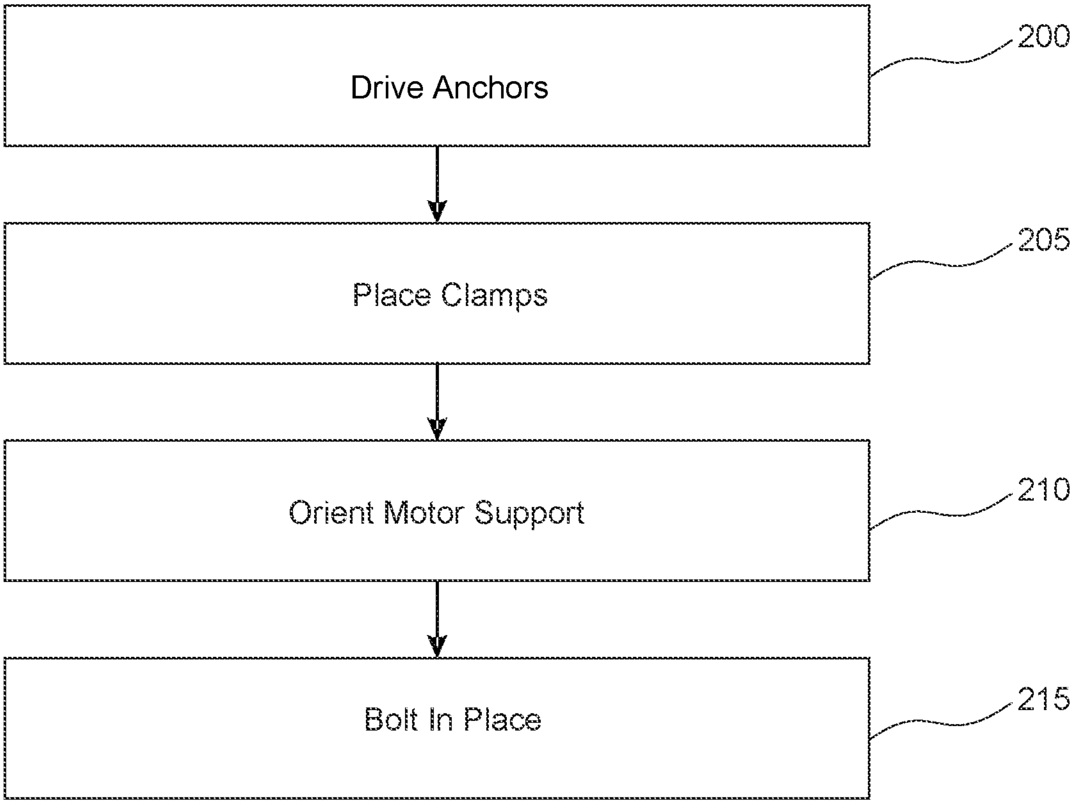
FIG. 4 is flow chart detailing the steps of a method for assembling a truss foundation for a tracker center structure according to various embodiments.

Assembly of the system described in the context of FIG. 3 is described according to at least one exemplary embodiment in the context of the flow chart of FIG. 4. The method begins in step 200 by driving a pair of adjacent screw anchors. As discussed herein, anchors are driven by applying a combination of torque and downforce to the coupler at the head of each screw anchor. It should be appreciated that the anchors used in this method may vary from those shown in the figures. In various embodiments, anchors may be driven with a rotary driver about either side of an in an intended North-South tracker row so that an axis through the center of each points at a common work point using a machine developed by the applicant of this disclosure known as a truss driver. The details of this machine have been intentionally omitted but may be found in U.S. Pat. No. 11,015,635 hereby incorporated by reference in its entirety.

Typically, though not necessarily, screw anchors are driven so as to maintain perpendicularity to the intended rotational axis of the tracker, which, in the case of the ATI tracker shown and discussed herein, is the torque tube itself. In various embodiments, the reveal height, which is the difference between the length of the anchor and the embedment depth, will be set to result in the center structure bearings being at the same height as the other bearings in the same row when the center structure is placed the center structure support. In various embodiments, the so-called truss driver machine that drives the screw anchors into underlying ground on the array site will compute the required embedment depth based on the screw anchor length, minimum embedment depth for that site and the intended height of the tracker's rotational axis, which in this case, is the torque tube, among other factors.

Once the pair of adjacent screw anchors have been driven, next, in step 205, clamps are placed around the driving coupler at the upper end of each screw anchor. The clamps may be manually held in place until one end of the center structure support is slid around them, and this process may be repeated for the second end. One or more bolts or other fasteners may be loosely passed through the slots in the center structure support and the clamp halves to keep the assembly from falling apart while positional adjustments are made. Then, at step 210, using a jig, laser alignment or other techniques, the center structure may be oriented at the precise height and level necessary to achieve alignment with other bearings in the row. For example, a laser target or other device may be attached to the center structure support to enable proper orientation of the support relative to the truss legs and clamp before locking them in place. Finally, at step 215 one or more bolts or other fasteners passing through the clamp halves and the center structure support are torqued down to the specified torque to preserve the orientation of the center structure support.

It should be appreciated that the specific geometry of the driving coupler is exemplary only. The concept is to take the geometry of this structure, which may be optimized for one or more different purposes and to adapt it to a geometric shape or other shape, in this case, a rectangular box, which can be supported with more conventional surface on surface mechanical fitment. Other coupler shapes are possible as long as the two clamp haves have reciprocal voids that enable them to capture coupler when clamped around it while providing flat external surfaces that can be received in the flanged openings of the center structure support. Also, it should be appreciated that although the single-axis tracker from ATI is shown in these figures, that the various embodiments of the invention may be used to support other tracker system as well.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A system for supporting a single-axis tracker center structure comprising:
- a pair of truss legs;
- a pair of adjustable leg clamp assemblies; and
- a center structure support, the center structure support adapted to receive the pair of adjustable leg clamp assemblies to unify the truss legs and providing a support platform for a single-axis tracker center structure that transfers torque to a torque tube, wherein the pair of leg clamp assemblies are received within openings in each of the opposing ends of the center structure support, wherein the center structure is configured to be adjusted relative to the pair of truss legs after receiving the pair of adjustable leg clamp assemblies, and wherein the center structure is configured to be adjusted relative to the leg clamp assemblies after receiving the pair of adjustable leg clamp assemblies.

2. The system according to claim 1, wherein each truss leg terminates in a driving coupler having at least one driving feature and a connecting portion extending away from the at least one driving feature.

3. The system according to claim 2, wherein the connecting portion comprises a projection with a plurality of adjacent channels circumscribing its surface.

4. The system according to claim 2, wherein each leg clamp assemblies comprises a pair of leg clamp halves that fit around the connecting portion and at least one driving feature.

5. A center structure assembly for a single-axis tracker comprising:

a pair of truss legs extending below and above ground, having a coupler at the above ground end of each leg;

a pair of adjustable clamp assemblies, each dimensioned to clamp around one of the couplers; and an elongated center structure support with a first end and an opposing second end, each of the first and second ends comprising an opening, the center structure support joining each truss leg via a connection to each clamp assembly, wherein each one of the clamp assemblies is captured in the openings within the opposing ends of the center structure, wherein the elongated center structure is configured to be adjusted relative to the truss legs after each one of the adjustable clamp assemblies is captured, and wherein the elongated center structure is configured to be adjusted relative to the adjustable clamp assemblies after each one of the adjustable clamp assemblies is captured.

6. The center structure assembly according to claim 5, further comprising a center structure attached to the center structure support, the center structure providing a pair of bearings for receiving a rotating torque tube.

7. The center structure assembly according to claim 6, wherein the center structure comprises a power output for transferring torque to a center structure in an adjacent tracker row.

8. The center structure assembly according to claim 6, wherein the center structure comprises a motor having an output that drives the rotating torque tube.

9. The center structure assembly according to claim 6, wherein the coupler comprises at least one driving feature and a connecting portion projecting away from the at least one driving feature.

10. The center structure assembly according to claim 9, wherein the connecting portion comprises a projection with a plurality of adjacent channels circumscribing its surface.

11. The center structure assembly according to claim 10, wherein each clamp assembly clamp half clamps around the projection and the at least one driving feature.

12. An assembly comprising:

a pair of adjustable clamp portions adapted to clamp around a top portion of a pair of truss legs, including a recess for receiving a portion of a foundation component; and an elongated center support, the center support adapted to span between the pair of truss legs and having a receiving portion comprising an opening at each end to receive one of the adjustable clamp portions and a platform portion for supporting a single-axis tracker center structure such that the elongated center support is adjustable with respect to the foundation component after the adjustable clamp portions are received within the openings of the center support, wherein the center structure is configured to be adjusted relative to the adjustable clamp portions after receiving the pair of adjustable leg clamp portions.

13. The assembly according to claim 12, further comprising a pair of truss legs.

14. The assembly according to claim 13, each truss leg comprising a driving coupler at an upper end, wherein the driving coupler is portion of the foundation component received in the recess.

15. The assembly according to claim 14, wherein the driving coupler comprises at least one driving feature and a connecting portion projecting away from the at least one driving feature.

16. The assembly according to claim 15, wherein the connecting portion is a projection with a plurality of adjacent channels circumscribing its surface.

17. The system according to claim 1, wherein the single-axis tracker center structure is a motorized center structure.

18. The system according to claim 1, wherein the single-axis tracker center structure is a non-motorized center structure.

* * * * *